United States Patent [19]
Murphy

[11] Patent Number: 5,576,531
[45] Date of Patent: Nov. 19, 1996

[54] HAND HELD BAR CODE SCANNING DEVICE HAVING A MANUALLY OPERATED OPTICAL TRIGGER SWITCH

[75] Inventor: Joseph F. Murphy, Webster, N.Y.

[73] Assignee: PSC Inc., Webster, N.Y.

[21] Appl. No.: 529,350

[22] Filed: Sep. 18, 1995

Related U.S. Application Data

[60] Continuation of Ser. No. 366,761, Dec. 30, 1994, abandoned, which is a division of Ser. No. 189,381, Jan. 31, 1994, abandoned.

[51] Int. Cl.$^6$ .................................................. G06K 7/10
[52] U.S. Cl. ................. 235/472; 250/221; 250/227.16; 250/568
[58] Field of Search ............................. 250/227.16, 221, 250/222.1, 568, 227.22, 231.19; 385/13, 16; 235/472

[56] References Cited

U.S. PATENT DOCUMENTS

| | | | |
|---|---|---|---|
| 4,593,186 | 6/1986 | Swartz et al. | 235/472 |
| 4,645,915 | 2/1987 | Van Ruyven | 235/472 |
| 4,766,299 | 8/1988 | Tierney et al. | 235/472 |
| 5,019,698 | 5/1991 | Eastman et al. | 235/462 |
| 5,056,884 | 10/1991 | Quinlan, Jr. | 385/13 |
| 5,132,523 | 7/1992 | Bassett | 235/462 |
| 5,155,345 | 10/1992 | Ito | 235/462 |
| 5,200,597 | 4/1993 | Eastman et al. | 235/455 |
| 5,212,371 | 5/1993 | Boles et al. | 225/472 |
| 5,212,372 | 5/1993 | Quick et al. | 235/472 |
| 5,222,165 | 6/1993 | Bohlinger | 250/227.6 |
| 5,237,161 | 8/1993 | Grodevant | 235/462 |
| 5,250,790 | 10/1993 | Metlitsky et al. | 235/472 |
| 5,250,792 | 10/1993 | Swartz et al. | 235/472 |
| 5,258,604 | 11/1993 | Behrens et al. | 235/462 |
| 5,260,554 | 11/1993 | Grodevant | 235/462 |
| 5,268,564 | 12/1993 | Metlitsky et al. | 235/462 |
| 5,315,097 | 5/1994 | Collins, Jr. et al. | 235/472 |
| 5,329,106 | 7/1994 | Hone et al. | 235/462 |
| 5,340,972 | 8/1994 | Sandor | 235/472 |
| 5,340,973 | 8/1994 | Knowles et al. | 235/472 |

FOREIGN PATENT DOCUMENTS 62-147578  7/1987  Japan ..................... 235/472

OTHER PUBLICATIONS

Harris, "Fiber-Optic Keyboard or Data Entry Device", *IBM Technical Disclosure Bulletin*, vol. 23, No. 2, Jul. 1980 pp. 721–722.

*Primary Examiner*—F. L. Evans
*Attorney, Agent, or Firm*—Joseph F. Murphy

[57] ABSTRACT

A hand held bar code scanning device includes scanning circuitry to conduct bar code scanning and a manually actuated optical trigger switch, connected to the scanning circuitry, to initiate bar code scanning.

4 Claims, 6 Drawing Sheets

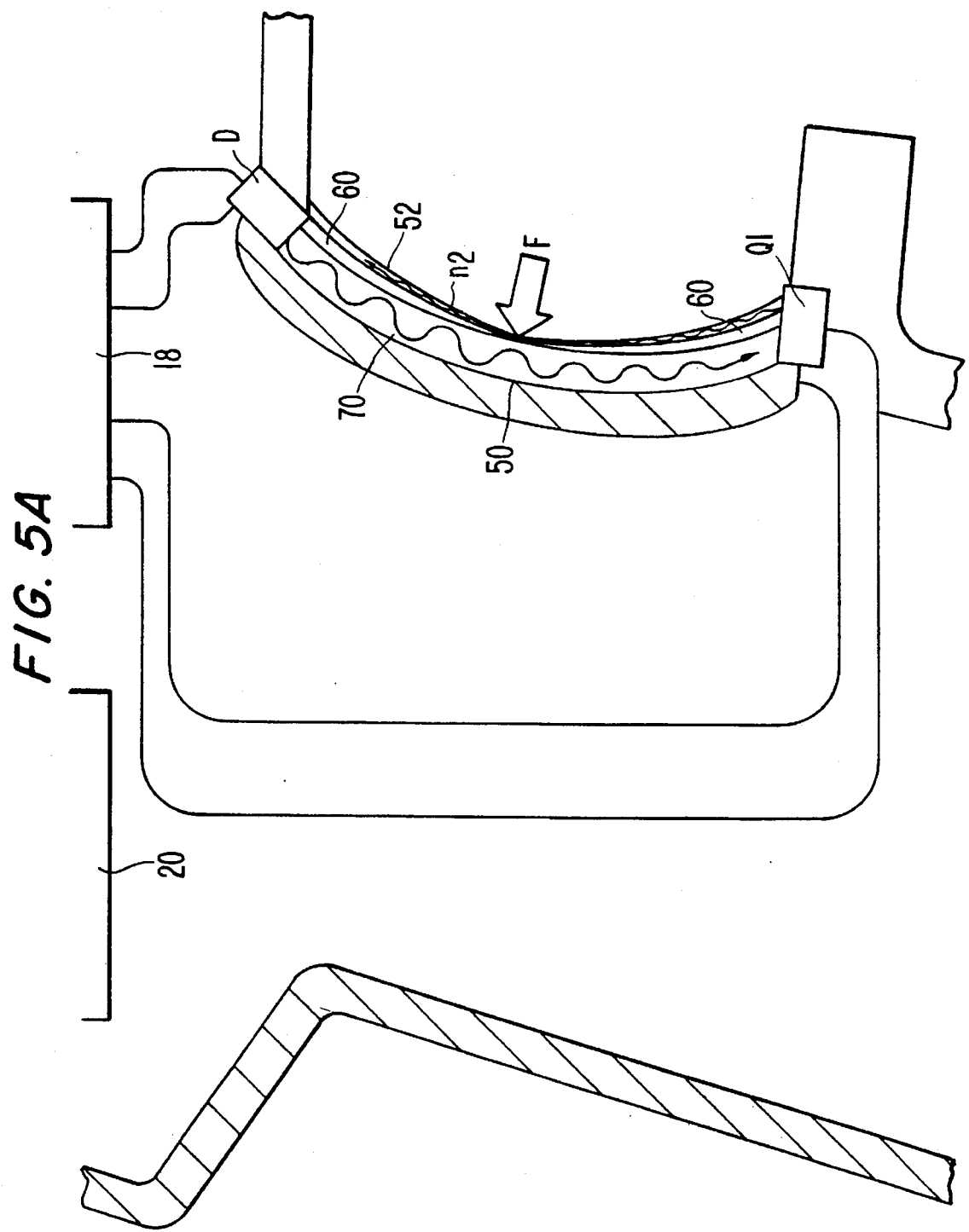

HAND HELD BAR CODE SCANNING DEVICE HAVING A MANUALLY OPERATED OPTICAL TRIGGER SWITCH

This application is a continuation of application Ser. No. 08/366,761, filed Dec. 30, 1994, which is a division of application Ser. No. 08/189,381, filed Jan. 31, 1994, both now abandoned.

BACKGROUND

The invention relates to a hand held bar code scanning device. More specifically, the invention relates to a hand held bar code scanning device which has a manually operated sealed optical trigger switch.

Bar code reading instruments are used in a wide variety of applications. For example, bar code reading instruments are used to read UPC (universal product code) information off of products in supermarkets and are used for inventory control during manufacturing.

FIG. 1 illustrates a conventional bar code reading instrument in the form of a scan gun 100. The scan gun 100 generates a beam which exits the scan gun via a window 10. The beam reflects off of the bar code being read and the reflected beam is received in the scan gun through window 10. The operator initiates scanning by depressing a mechanical trigger 20. When mechanical trigger 20 is depressed, it pivots around a pivot 30 and a lever arm thereof activates a mechanical/electrical switch 40, which in turn sends an electrical trigger signal to scanning circuitry.

The detailed design of bar code reading instruments, including the scanning circuitry, is described in U.S. patent application Ser. No. 08/056,887, filed Apr. 2, 1993 by Chay La, and entitled "Non-Contact Actuated Trigger Apparatus for Bar Code Laser Scanner"; U.S. Pat. No. 5,258,604, which was issued to James Behrens et al. on Nov. 2, 1993 and is entitled "Bar Code Scanner"; U.S. Pat. No. 5,237,161, which was issued to Scott R. Grodevant on Aug. 17, 1993 and is entitled "System for Automatically Reading Symbols, Such as Bar Codes, on Objects Which are Placed in the Detection Zone of a Symbol Reading Unit, Such as a Bar Code Scanner"; U.S. Pat. No. 5,212,371, which was issued to John A. Boles et al. on May 18, 1993 and is entitled "Hand Held Bar Code Scanner with Improved Aiming Means"; U.S. Pat. No. 5,200,597, which was issued to Jay M. Eastman et al. on Apr. 6, 1993 and is entitled "Digitally Controlled System for Scanning and Reading Bar Codes"; and U.S. Pat. No. 5,019,698, which was issued to Jay M. Eastman et al. on May 28, 1991 and is entitled "Bar Code Reading System Having Electrical Power Conservation and Laser Radiation Power Limiting Means." The entire contents of this patent application and all five of these patents are incorporated herein by reference. This above-referenced application and these patents are assigned to PSC, Inc. (Webster, N.Y.), the assignee of the present application.

U.S. Pat. No. 5,250,790, which was issued to Boris Melitsky et al. on Oct. 5, 1993, entitled "Hand-Mounted Scanner with Automatic Manual Initiation of Reading Indicia"; U.S. Pat. No. 5,250,792, which was issued to Jerome Swartz et al. on Oct. 5, 1993, entitled "Portable Laser Diode Scanning Head"; and U.S. Pat. No. 4,593,186, which was issued to Jerome Swartz on Jun. 3, 1986, entitled "Portable Laser Scanning System and Scanning Methods," all assigned to Symbol Technologies, Inc. (Bohemia, N.Y.), disclose other conventional scanners.

The inventors have discovered that use of a mechanical trigger and a mechanical/electrical switch, such as disclosed in the above-identified patents, results in several disadvantages. Mechanical components are prone to failure due to dust and moisture which can enter the components. Static electricity, such as that created from walking on a rug with a scan gun, can enter the internals of the scan gun through gaps and mechanical joints and adversely affect electrical circuitry therein.

Because mechanical switches may create a spark, some (though decidedly not all) mechanical switches are not suitable for use in potentially explosive environments without complicated sealing arrangements. Mechanical/electrical switches generate output signals which are somewhat irregular and may suffer switch bounce effects and are thus less than ideal for use in conjunction with digital circuitry. Moreover, mechanical parts are subject to wear and thus degrade over time. In addition, repetitive operation of a mechanical switch can create stress in the fingers, hands, and wrists of the individual operating the scanner.

SUMMARY OF THE INVENTION

It is an object of the invention, therefore, to provide an improved bar code reading instrument.

Another object of the invention is to provide a bar code reading instrument which is better sealed than reading instruments containing mechanical triggers and is thus more suitable for use in environments containing dusts, moisture, potentially explosive materials, and static electricity.

A further object of the invention is to provide a bar code reading instrument which generates electrical output signals which are more compatible for use in conjunction with digital circuitry.

Yet another object of the invention is to provide a bar code reading instrument which is not appreciably susceptible to wear and degradation over time.

According to one aspect of the invention there is provided a bar code reading instrument which includes scanning circuitry to conduct bar code scanning and a non-mechanical trigger switch, such as a sealed optical trigger switch, connected to the scanning circuitry to initiate bar code scanning. The optical trigger switch can include a transmitter to transmit light and a receiver to receive light transmitted by the transmitter. The transmitter may include a light source such as a diode to transmit light and the receiver may include a transistor to receive light. In one implementation, an optical waveguide is provided between the transmitter and the receiver.

According to another aspect of the invention there is provided a bar code reading instrument which includes scanning circuitry to conduct bar code scanning and an optical trigger switch. The optical trigger switch includes a transmitter to transmit electromagnetic radiation and a receiver to receive electromagnetic radiation transmitted by the transmitter. Sensing circuitry is coupled to the scanning circuitry and to the optical trigger switch to determine the amount of electromagnetic radiation received by the receiver, if any, and to initiate bar code scanning based upon a change in the amount of electromagnetic radiation received by the receiver.

Other objects, features, and advantages of the invention will be apparent from the detailed description of preferred embodiments set forth below.

BRIEF DESCRIPTION OF THE DRAWINGS

Specific embodiments of the invention will be described below with reference to the accompanying drawings, wherein:

FIGS. 5A and 5B depict the arrangement of FIG. 4 in more detail;

DETAILED DESCRIPTION OF SPECIFIC EMBODIMENTS

Figure 1:
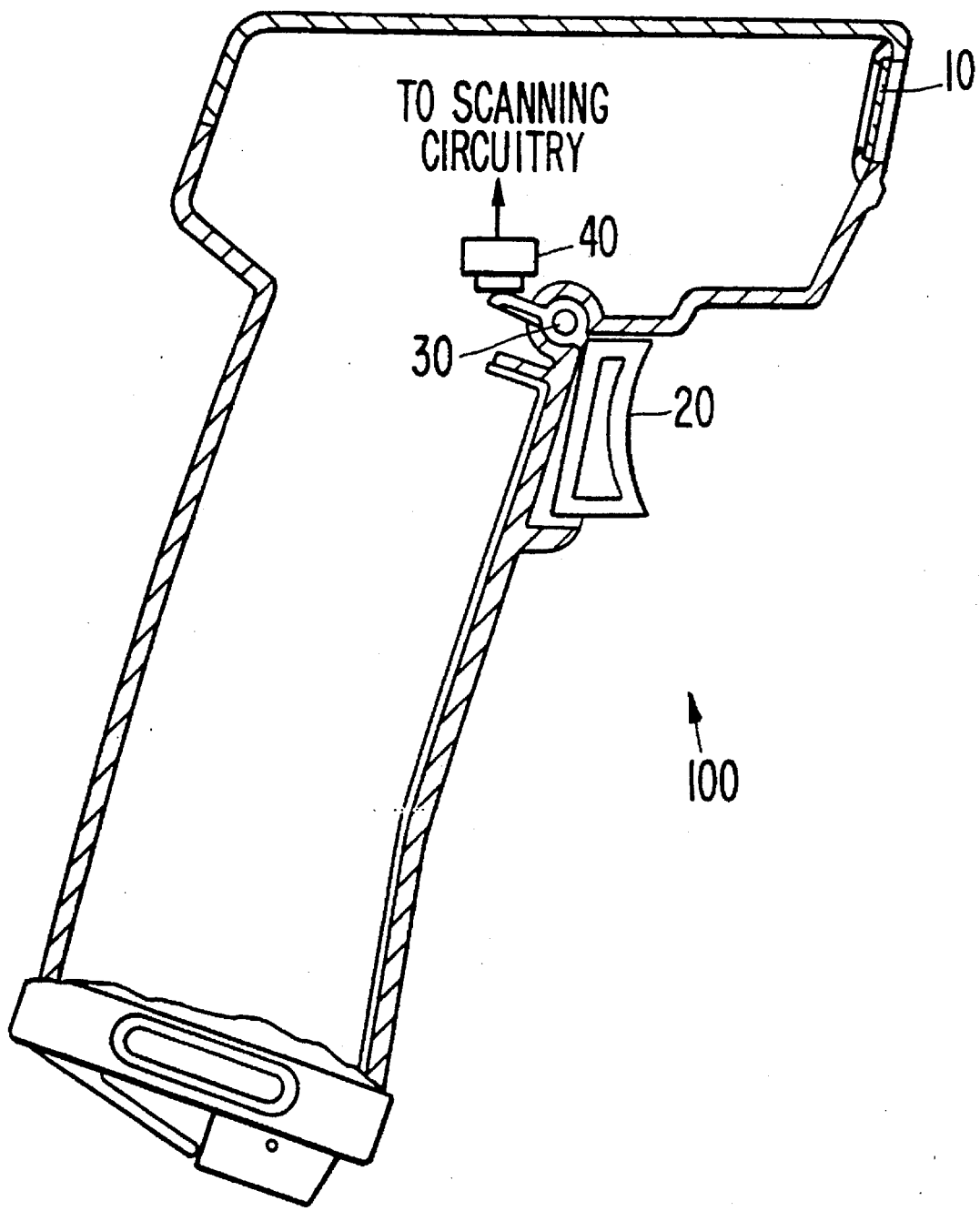
FIG. 1 illustrates a conventional scan gun.
Figure 2:
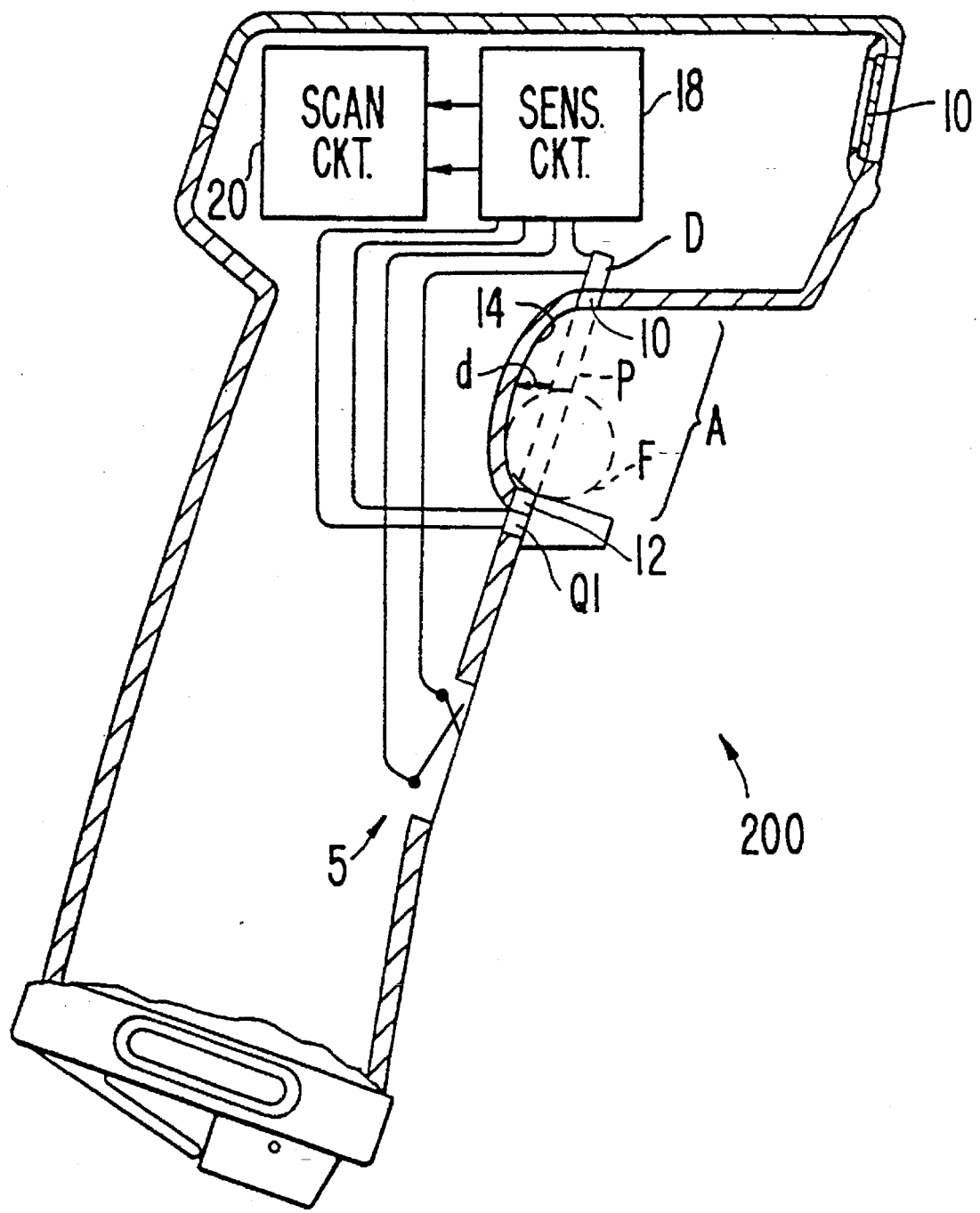
FIG. 2 illustrates a scan gun according to one embodiment of the invention.
Figure 3:
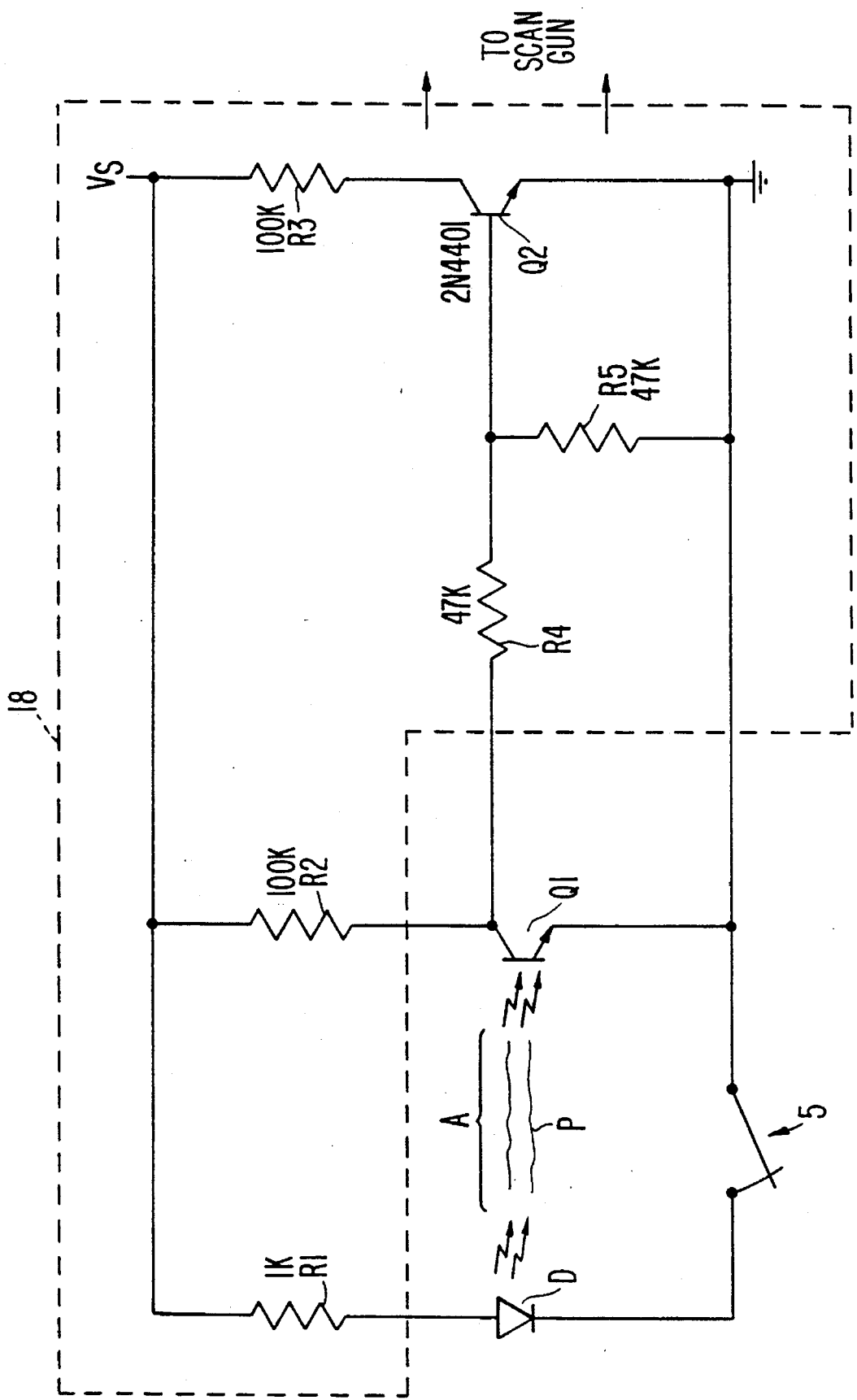
FIG. 3 is a schematic diagram of an electrical circuit for use with the optical switch of the FIG. 2 embodiment.

FIGS. 2 and 3 illustrate a scan gun 200 according to one embodiment of the invention. This embodiment employs an optical trigger switch instead of a mechanical trigger switch. Use of an optical trigger switch provides a bar code reading instrument which is better sealed and thus more suitable for use in environments containing dusts, moisture, potentially explosive materials, and static electricity. In addition, the invention results in less stress on the operator, is less susceptible to wear and degradation, and generates output signals which are more compatible for use with digital circuitry.

The optical trigger switch includes a diode D which emits light in the direction of a light activated transistor Q1 along beam path P. In this particular embodiment, diode D emits infrared light and transistor Q1 is activated by infrared light; however, light or electromagnetic radiation of other wavelengths can be used.

When an operator's finger F is inserted into area A between diode D and transistor Q1 (as shown in FIG. 2), the light path between diode D and transistor Q1 becomes obstructed. Obstructing the light path initiates the scanning process and causes a scanning beam to be emitted from window 10'. When area A is not obstructed, such as when the operator's finger F is removed, infrared light from diode D is received in transistor Q1 and the scanning beam is not emitted from window 10'.

The scanning beam is transmitted as long as the light path is obstructed, until either a bar code is successfully read or until a "time-out" occurs, i.e., until a preset time (e.g., 5 seconds) has elapsed. After this preset has elapsed, and yet no bar code has been successfully read the scanning circuitry 20 will cause the scanning beam to be terminated even if the operator continues to obstruct the light path.

Diode D and transistor Q1 are housed inside the body of scan gun 200 adjacent transparent windows 10 and 12 respectively. These windows form a contiguous smooth surface with the non-transparent adjacent portions of the housing so as to provide a sealed unitary structure. Moreover, the distance d between the concave surface 14 and the light path P is quite small, on the order of 1/16 to 1/2 inch, to permit facile operation of the gun by relatively short movements of the operator's finger.

Diode D and transistor Q1 are connected to an electrical sensing circuit 18 via an on/off switch 5 which in turn is connected to a conventional scanning circuit 20. In this particular embodiment, switch 5 is a membrane switch located in the hand grip and turns on when the scan gun is gripped by the operator and is biased, e.g., spring-loaded, to turn off when the scan gun is not being used. Alternatively, the on/off switch can be located at any convenient location on the gun housing. In certain applications, for example, certain scanners that are connected to wall outlets, or when concerns about power consumption and/or battery life are inappropriate, the on/off switch is unnecessary and is omitted.

FIG. 3 illustrates a suitable design for the electrical scanning circuit 18. As illustrated in FIG. 3, the anode of diode D is connected to a supply voltage $V_S$ via a 1 K ohm resistor R1. The supply voltage can be, for example, 5 volts DC, which is obtainable, for example, from a 9 volt battery. The cathode of diode D is connected to ground.

Transistor Q1 has its collector connected to the supply voltage $V_S$ via a 100 K ohm resistor R2. The emitter of transistor Q1 is connected to ground. The collector of a switching transistor Q2 is connected to the supply voltage $V_S$ via a 100 K ohm resistor R3. The switching transistor Q2 can be, for example, a 2N4401 NPN transistor. The emitter of switching transistor Q2 is connected to ground. The base of transistor Q2 is connected to ground via a 47 K ohm resistor R5 and to the collector of transistor Q1 via a 47 K ohm resistor R4.

The operation of the circuit illustrated in FIG. 3 will now be described. When the scan gun is being held and a finger is not inserted into area A, i.e., when the light path is not broken, the light from diode D maintains transistor Q1 in the on (conductive) state. When transistor Q1 is on, the base of transistor Q2 will be at approximately ground, which maintains Q2 in the off (non-conductive) state. When transistor Q2 is in the off state, voltage $V_S$ is provided to the scanning circuitry, which in response does not initiate scanning.

On the other hand, when a finger is inserted into area A, the light from diode D does not reach transistor Q1 and thus transistor Q1 shuts off. When transistor Q1 is off the base of transistor Q2 will be at a voltage high enough to turn transistor Q2 on. When transistor Q2 is on, a voltage of approximately zero volts is provided to the scanning circuitry, which in turn initiates scanning.

Figure 4:
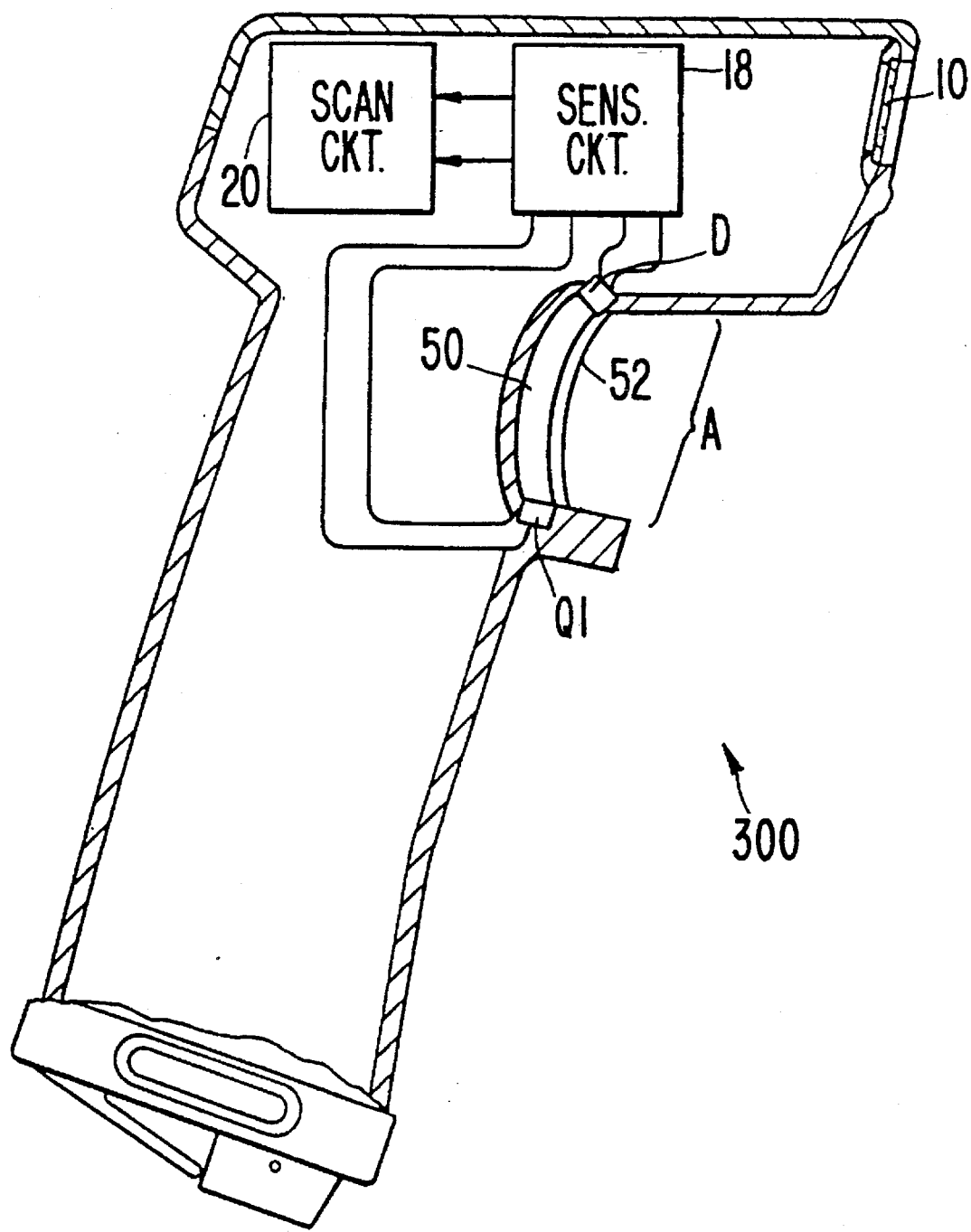
FIG. 4 illustrates a design of an alternative embodiment of the invention.
Figure 5B:
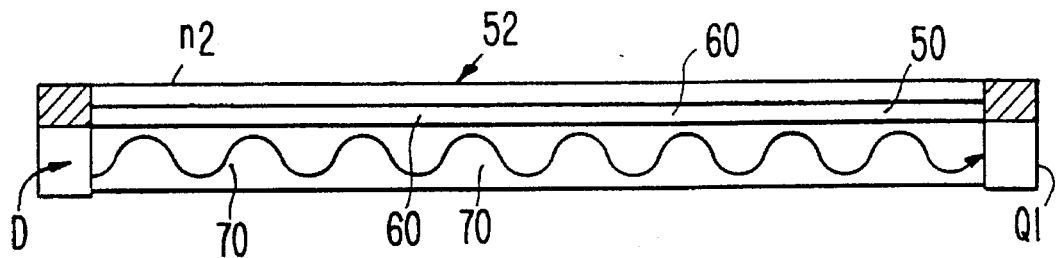
Figure 6:
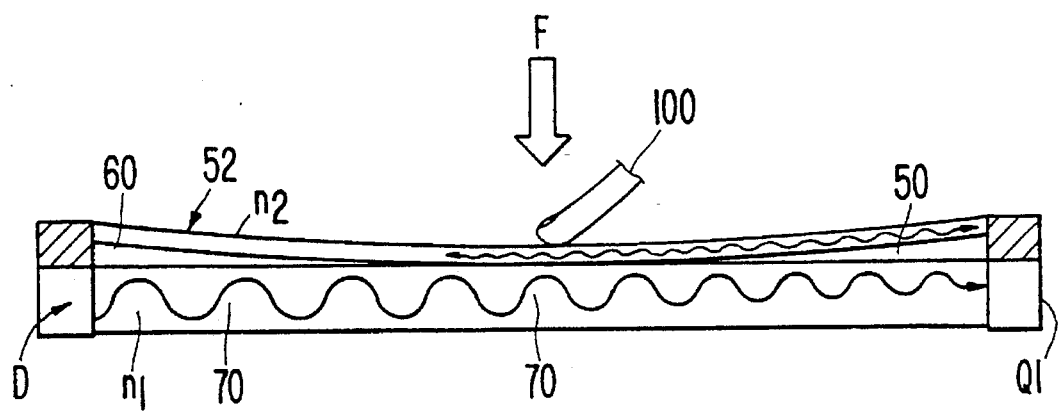
FIG. 6 depicts an operation of the device depicted in FIGS. 4, 5A and 5B.

The invention is not limited to the specific configuration illustrated in FIGS. 2 and 3. Other types of optical apparatus can be employed. For example, as shown in FIG. 4, an optical waveguide 50 can be provided to conduct light between the diode D and the transistor Q1. FIGS. 5A and 5B depict the arrangement of FIG. 4 in more detail; note that light 70 from diode D is bounded in waveguide 50 by the effective cladding provided by the air 60 adjacent the waveguide 50. This light from D is received at Q1. A suitable member 52, made of a plastic or other material having an index of refraction $n_2$, which is higher than index of refraction $n_1$ of waveguide 50, is located proximate to optical waveguide 50, such that when the member 52 is depressed by a force F (see FIG. 6) (which force may be provided by finger 100) member 52 is brought in contact with the optical waveguide 50, and sufficient light is coupled out of the waveguide 50 and into member 52 to diminish the light received at Q1 and activate a sensing circuit, such as the circuit of FIG. 3.

Figure 7:
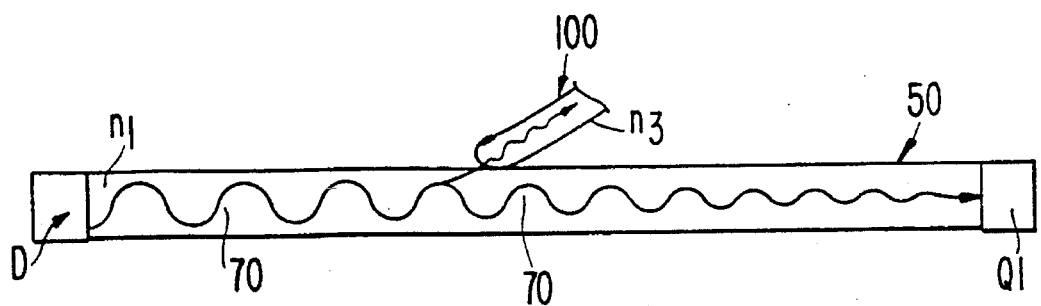
FIG. 7 depicts an alternate embodiment of the instant invention.

Alternatively, the member 52 can be omitted. In this alternative arrangement, when an suitable object, such as an operator's finger 100, having an index of refraction $n_3$, which is higher than index of refraction $n_1$ of optical waveguide 50, is brought adjacent the optical waveguide 50, sufficient light is coupled out of waveguide 50 into finger 100 itself to diminish the light received at Q1 and activate a sensing circuit, such as the circuit of FIG. 3. This alternative arrangement is depicted in FIG. 7.

Note that in FIGS. 4–7 the on/off switch 5 has been omitted for clarity; it could optionally have been included.

The invention has been described above with reference to certain specific implementations; however, the scope of the invention is not limited to the specific implementations set forth above. Other designs within the scope of the invention will be apparent to those skilled in this technical field after receiving the above teachings. The scope of the invention, therefore, is defined by reference to the following claims.

What is claimed is:

1. A hand-held code reading device having a scanning circuitry for scanning codes, comprising:

a housing having a portion adapted to be hand held by an operator;

a light source for generating a light beam;

an optical waveguide for directing the light beam along a first light path external to the housing;

an optical switching device located along the first light path and arranged to receive the light beam, and adapted to be selectively activated by a first portion of the hand holding the reading device;

a light intercepting means located adjacent the first light path for intercepting and diverting the light beam to a second path that is different from the first path;

a power switch on the housing, adapted to be turned on with a second portion of the hand holding the reading device; and a circuitry for initiating a scanning operation, wherein the initiating circuitry initiates the scanning operation when the first portion of the hand holding the reading device touches or presses the power switch and the second portion of the hand holding the reading device touches or presses the light intercepting means, whereupon the light beam is diverted to the second path so that the optical switching device receives only a portion of the light beam, and wherein the circuitry disables the scanning operation when either the first hand portion is released from the light intercepting means or the second hand portion is released from the power switch.

2. A code reading device according to claim 1, wherein the light intercepting means includes the optical waveguide having an index of refraction lower than that of the first hand portion touching the intercepting means, wherein the optical switching device is deactivated by touching the optical waveguide with the portion of the hand to initiate the scanning operation, whereupon a portion of the light beam is coupled out of the optical waveguide.

3. A code reading device according to claim 1, wherein the light intercepting means includes a member adjacent to and spaced from the optical waveguide, wherein the member has an index of refraction higher than that of the optical waveguide, wherein the optical switching device is deactivated by pushing the member into contact with the optical waveguide to initiate the scanning operation, whereupon a portion of the light beam is coupled out of the optical waveguide.

4. A method of operating a hand-held code reading device comprising the steps of:

selectively turning on the reading device by touching or pressing a power switch with a first portion of a hand holding the reading device;

guiding a light beam along a first path using a waveguide;

placing an optical switch along the first path to receive the light beam, whereupon the switch becomes activated;

selectively intercepting and diverting a portion of the light beam into a second path that is different from the first path by bringing an object having an index of refraction higher than that of the waveguide in contact with or away from the waveguide with a second portion of the hand holding the device, whereupon the portion of the light beam is coupled out of the first path and into the second path;

initiating a scanning operation in response to the first hand portion touching or pressing the power switch and the second hand portion touching or pressing the waveguide; and selectively stopping the scanning operation by releasing the first hand portion from the power switch or the second hand portion from the waveguide.

* * * * *